W. JENCKES.

Spinning-Rings.

No. 5,702. Reissued Dec. 23, 1873.

Witnesses.

S. N. Piper.

L. N. Holden

Welcome Jenckes by his attorney.

R. H. Eddy

AM. PHOTO-LITHOGRAPHIC Co. N.Y. (OSBORNE'S PROCESS).

UNITED STATES PATENT OFFICE.

WELCOME JENCKES, OF MANCHESTER, NEW HAMPSHIRE, ASSIGNOR TO GEORGE DRAPER & SON, OF HOPEDALE, MASSACHUSETTS.

IMPROVEMENT IN SPINNING-RINGS.

Specification forming part of Letters Patent No. 39,657, dated August 25, 1863; reissue No. 5,702, dated December 23, 1873; application filed September 6, 1873.

*To all whom it may concern:*

Be it known that I, WELCOME JENCKES, of Manchester, in the county of Hillsborough and State of New Hampshire, have invented a new and useful Improvement in the Ring Spinning-Frame; and I do hereby declare that the following is a full, clear, and exact description of the same, reference being had to the accompanying drawing forming part of this specification, in which—

Figure 1:
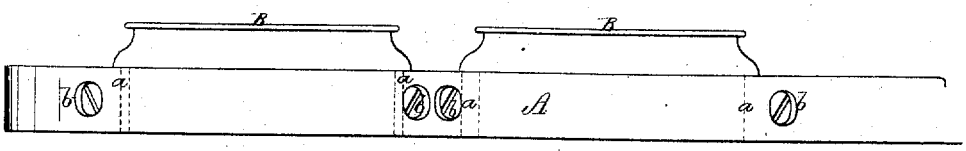
Figure 2:
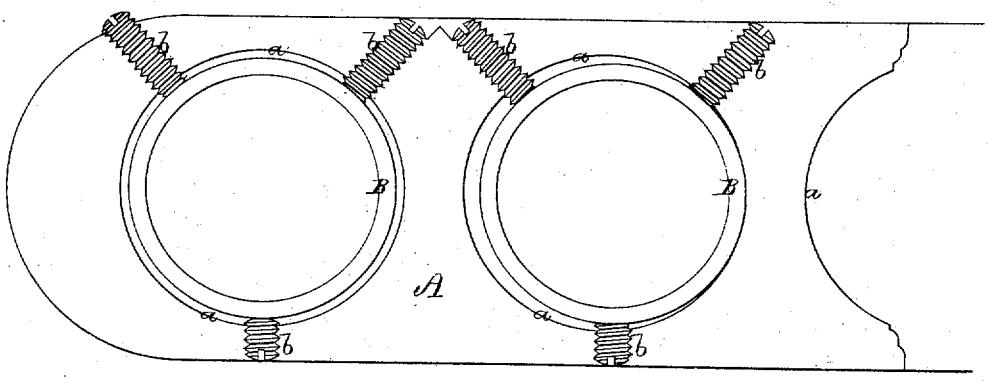

Figure 1 is a front view of a portion of the ring-rail of a ring spinning-frame illustrating my improvement. Fig. 2 is a horizontal section of the same.

Similar letters of reference indicate corresponding parts in both figures.

In all ring spinning-frames constructed prior to my invention, as far as known to me, in which the rings have been fitted into openings provided for them in the ring-rail, such rings have been held snugly without any provision for adjusting them therein. The said rail is held in place by lifting-rods, which, when in use, work up and down in stationary guides provided for them in the frame, and, as the rods and guides may wear, the rings become eccentric to the spindles, and thereby cause great irregularity in the draft of the yarns in every revolution of the travelers and spindles, imperfect work being thereby produced.

The object of my invention is to provide for the adjustment of each of the several rings in its socket in the rail, to set it concentric with its spindle; and to this end the invention consists in the combination of a ring-rail, provided with a passage through it, with a ring projecting partially within such passage, and with means or mechanism, substantially as described, by which such ring, on becoming eccentric to the spindle, may be moved or adjusted in such passage, and fixed into concentricity with the spindle; also, a ring-rail having each of the sockets for the rings made larger in diameter than the neck or portion of the ring to enter it, and provided with adjusting-screws, arranged substantially in the manner specified.

To enable others skilled in the art to apply my invention, I will proceed to describe it with reference to the drawings, in which—

A is the rail, and B B are two of its rings, these latter being of the usual construction. *a a* are the holes or sockets in the rails for the reception of the rings, each of such holes being about one-eighth of an inch larger in diameter than the exterior of the neck or portion of the ring which is received within it. *b b b* are the adjusting-screws, of which I propose to use three for each ring, as a perfect adjustment cannot well be obtained with a less number. These screws are inserted, from opposite sides of the rail, (two from one side and one from the other,) into tapped holes, or female screws, provided in the rail for their reception, and are arranged radially to the axis of the ring-receiving aperture, and, as nearly as practicable, at equal distances apart around it. They should be screwed tightly enough against the ring to hold it in place.

When a ring requires adjustment, one or more of its respective screws are to be screwed outward and the other or others screwed inward until the ring is brought concentrically with its spindle, each ring being thus adjusted independently of each of the remainder of them.

What I claim as my invention is as follows:

1. The combination of a ring-rail, provided with a passage through it for the spindle, with a ring projecting partially within such passage, and with means or mechanism, substantially as described, by which such ring, on becoming eccentric to the spindle, may be moved or adjusted in such passage, and fixed into concentricity with the spindle.

2. A ring-rail having each of the sockets for the rings made larger in diameter than the neck or portion of the ring to enter it, and provided with adjusting-screws, arranged substantially in the manner specified.

WELCOME JENCKES.

Witnesses:
FRANK HILAND,
W. H. CATE.